United States Patent [19]

Tanaka

[11] Patent Number: 4,556,264

[45] Date of Patent: Dec. 3, 1985

[54] TELEPHONE CONNECTOR

[75] Inventor: Masanori Tanaka, Osaka, Japan

[73] Assignee: Hosiden Electronics Co., Ltd., Japan

[21] Appl. No.: 587,365

[22] Filed: Mar. 8, 1984

[30] Foreign Application Priority Data

Mar. 15, 1983 [JP] Japan .............................. 58-37900[U]
Jun. 25, 1983 [JP] Japan .............................. 58-98292[U]

[51] Int. Cl.$^4$ ...................... H01R 9/09; H01R 13/447; H01R 13/514; H02B 1/02

[52] U.S. Cl. ................................ 339/17 LC; 339/36; 339/126 R; 339/176 M

[58] Field of Search ....... 339/171 LC, 126 R, 176 M, 339/176 MP, 36, 125 R, 17 L; 179/178, 186

[56] References Cited

U.S. PATENT DOCUMENTS

| | | | |
|---|---|---|---|
| 3,639,893 | 2/1972 | Kunkle et al. | 339/17 L X |
| 3,729,701 | 4/1973 | Smith | 339/258 S X |
| 4,065,198 | 12/1977 | Jordan | 339/210 R X |
| 4,221,458 | 9/1980 | Hughes et al. | 339/17 MP X |
| 4,274,691 | 6/1981 | Abernathy et al. | 339/176 MP X |
| 4,337,574 | 7/1982 | Hughes et al. | 29/864 X |
| 4,367,908 | 1/1983 | Johnston | 339/205 X |

*Primary Examiner*—Gil Weidenfeld
*Assistant Examiner*—Steven C. Bishop
*Attorney, Agent, or Firm*—Steele, Gould & Fried

[57] ABSTRACT

A telephone connector comprises: a box-shaped body having front, rear and bottom walls, the front wall having a plug inlet formed therein for receiving a comb-tooth shaped plug and the rear and bottom walls having a holder mounting opening formed therein; the bottom and rear walls together having formed therein three sets of aligned, parallel grooves; a plurality of pre-shaped conductive springs adapted for insertion through the holder mounting opening and for mounting in the grooves; and, a spring holder having a rear side portion and a projecting piece adapted to be locked into a position closing the holder mounting opening to seal the body against dust intrusion, the projecting piece having a free edge pressably engaging the springs and the rear side portion having a projecting rib forming a lower abutment effectively closing those grooves in the rear wall, whereby a plurality of full pre-shaped spring contacts may be easily inserted and precisely positioned in the body, and positively secured therein.

6 Claims, 14 Drawing Figures

TELEPHONE CONNECTOR

BACKGROUND OF THE INVENTION

1. Field of the Invention

This invention relates to a telephone connector and more particularly to a connector of the type used with a comb-tooth shaped plug removably insertable into connection with and disconnection from a plurality of electric contact pieces housed in a box-shaped body of the connector.

2. Prior Art

The described type of telephone connectors generally used are already made according to standards of the U.S. Federal Communications Commission and are widely used in offices and homes.

A conventional type of this telephone connector is of the construction in which a plurality of springs made of good conductive electric wire are arranged in parallel inside a box-shaped body. The body has a plug inlet in the front wall thereof so as to face the springs to the plug inlet. Each of the springs is resiliently inserted into a corresponding groove of the plug to make electrical connection with the contacts of a plug inserted into the inlet, the type of plug being referred to as a "comb-tooth shape plug" in this specification. The plug has a plurality of electrodes disposed in parallel connection grooves in the form of comb-teeth.

For example, referring to the basic structure of the telephone connector shown in FIG. 1 of the drawings, the connector is of the construction in which the connector is mounted by projecting the respective upper portions of a plurality of springs 100 beyond the bottom of a body 101, to attach the body 101 as to a printed board (not shown) and soldering the respective lower ends of the springs 100 directly to the conduction pattern of the printed board.

However, the connector of the construction described above involves the difficulty of inserting straight-line springs 100 one by one into the holes 103 formed in the bottom wall of the body 101, bending the upper end portion of each spring 100, and forming the same into a required shape as shown. Accordingly, the connector involves such a problem of production technique that the connector is difficult to assemble and it is difficult to effect secure precision precise alignment of the attachment portions of the springs 100.

As far as the inventor knows, the jacks having such problems are (see FIG. 1) disclosed in U.S. Pat. No. 4,297,529 to Webb and also disclosed in U.S. Pat. No. 4,269,463 to Beatenbough. These jacks are of the same construction and involve the same problems as the telephone connector described above.

A further problem with the connectors mentioned above is due to the body 101 being internally molded in a metal mold. It is often necessary to form an opening 104 in the rear side opposite the plug inlet to facilitate the molding process. As a result dust or the like enters the body 101 through the opening 104 and falls onto the conductive portions springs 100 and on the electrodes of the plug, resulting in defective contact and noise trouble.

SUMMARY OF THE INVENTION

Accordingly, a primary object of the invention is to provide a telephone connector into which it is not only very simple to incorporate springs, which make contact pieces, into the connector body but is also easy to produce.

Another object of the invention is to provide a telephone connector in which dust will not collect and cause defective contact of conductive parts and noise.

Still another object of the invention is to provide a telephone connector which permits the incorporation of springs thereinto with high precision, and which can be made smaller in size.

These objects can be achieved by a connector which comprises: a box-shaped body having a plug inlet in the front wall and having on the rear wall a holder mounting opening communicating with the plug inlet; a plurality of parallel vertically extending terminal grooves disposed at specified intervals adjacent the rear opening of the rear wall of the body; lower holding grooves communicating with the terminal grooves above the bottom wall of the body; a plurality of springs made of good conductive metal which each have a U-shaped main body portion and receives a first free end extending outwardly from one side of the main body into the upper holding grooves so as to use the free end as a conductive contact-maker movable toward and away from the electrodes of the plug and which each use a second free end extending outwardly from the other side of the main body portion as a connection terminal portion of other electronic parts, and a holder having a projecting press piece extending from the lower end edge of the rear side closing the holder mounting opening inwardly of the plug inlet and adapted to enage in the holder mounting opening.

Furthermore, still another object of the invention is to provide a telephone connector easily mounted on a printed board or the like, which telephone connector is further formed with a connection groove adapted to receive thereinto a second free end of each spring below the lower holding groove of the body to directly insert and pull a conduction portion as of the printed board into and out of the connection groove to thereby permit mounting of the connector simultaneously with electrical connection of the conduction portion with other electronic parts.

BRIEF DESCRIPTION OF THE DRAWINGS

Other features and advantages of the invention will become apparent from the following description of preferred embodiments of the invention given in conjunction with the accompanying drawings wherein:

FIG. 2 is an exploded perspective view, broken in part, of the telephone connector;

FIG. 3 is a front view showing the telephone connector seen from the side formed with a plug inlet;

FIG. 4 is a longitudinal sectional side view of the connector;

FIG. 5 is a bottom view of the connector;

FIG. 6 is a rear view seen from a holder mounting opening;

FIG. 7 is a longitudinal sectional side view of the connector in time of use and having a plug inserted thereinto;

FIG. 8 is a longitudinal sectional side view of the telephone connector;

FIG. 9(*a*) is a longitudinal sectional side view of the connector in time of use and having a plug inserted thereinto;

FIG. 9(*b*) is identical to FIG. 9(*a*) except for showing the embodiment with a vertically deformable projection, as in FIG. 7;

FIG. 10 is a perspective view, broken in part, of the telephone connector having the conduction portion of a printed board connected to a second free terminal of a spring;

FIGS. 11 to 13 are longitudinal sectional views, broken in part, respectively of the main part of the telephone connector having a second free end of the spring connected to the conduction portion of each of various printed boards.

DETAILED DESCRIPTION OF THE INVENTION

A detailed description will now be given of preferred embodiments of the invention with reference to the accompanying drawings.

FIGS. 2 to 7 show a first embodiment of the invention.

Figure 5:
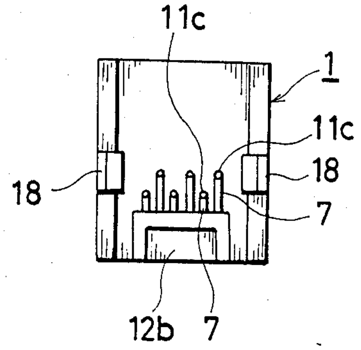
Figure 2:
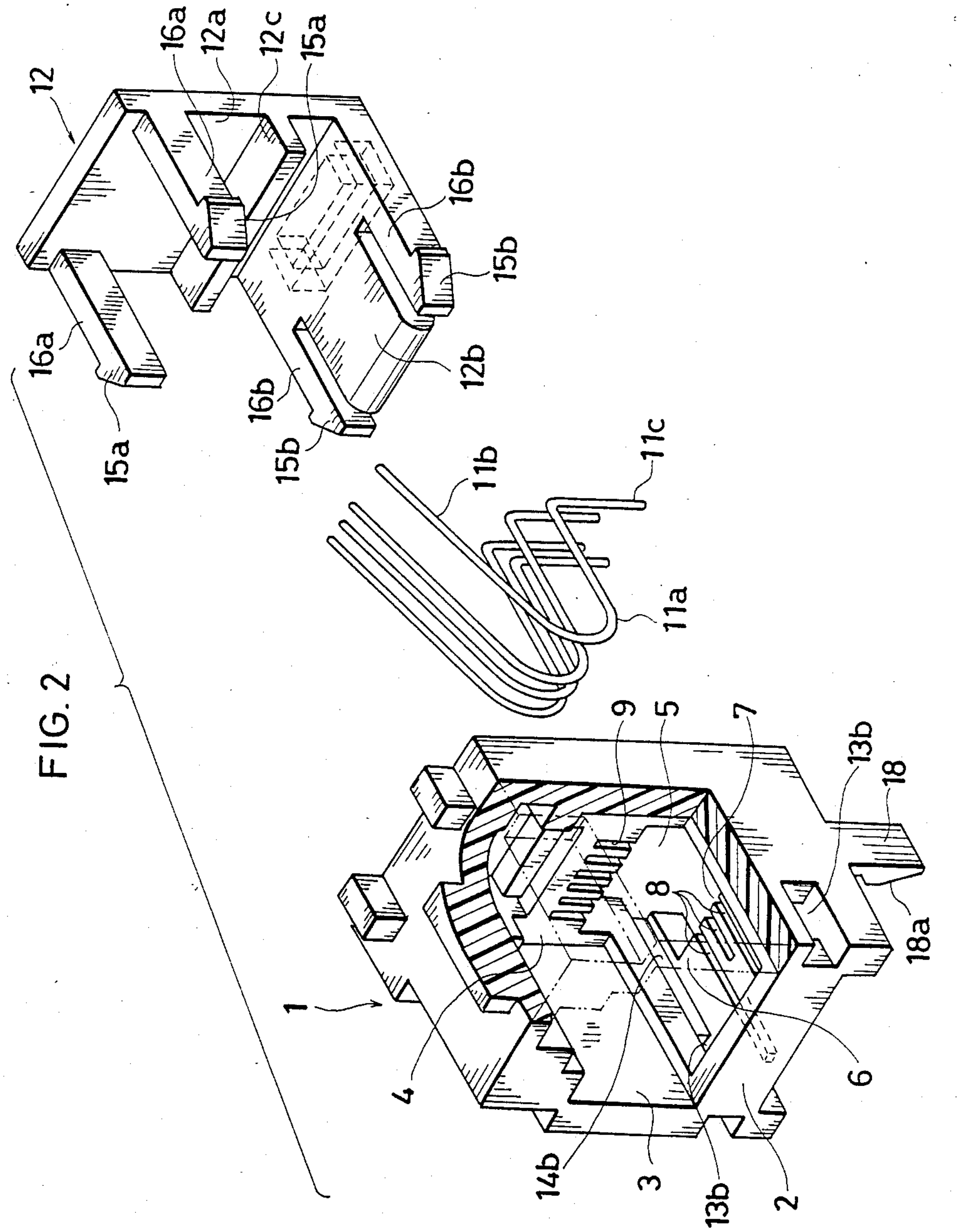

In the figures, the numeral 1 designates a body. The body is molded of synthetic resin into a box shape. A plug inlet 3 is formed in the middle of the front wall 2 thereof and a holder opening 5 is formed in the rear wall 4, the holder opening 5 communicating with the plug inlet 3. The lower edge of the holder mounting opening 5, as best seen in FIGS. 2 and 5, corresponds to the terminal end edge of the bottom wall 6 of the body 1. Also, a plurality of vertically extending terminal leading or lead-in grooves 7 are formed parallel to each other at specified intervals in the rear opening portion of the bottom wall 6. The grooves 7 are respectively of cut groove shape and are alternated in position by a shallow cut and a deep cut. Also, above the bottom wall 6 are formed lower holding grooves 8 continuing to terminal leading grooves 7, and a plurality of vertically extending slender upper holding grooves 9 are formed in the rear wall 4 in corresponding relation with the terminal leading grooves 7. The upper holding grooves 9 open at the lower edge of the rear wall 4 and continue to the holder mounting opening 5. Further, guide grooves 14*a* and 14*b*, each having an engaging recess 13*a*, are formed on each of upper and lower corners of a cavity 1*a* leading from the plug inlet 3 of the body 1 to the holder mounting opening 5.

Figure 1:
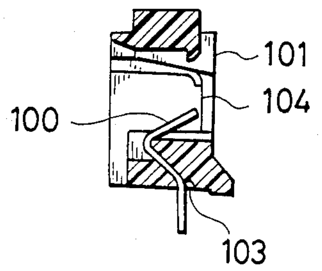
FIG.1 PRIOR ART
FIG. 1 is a longitudinal sectional view of a conventional telephone connector.
Figure 3:
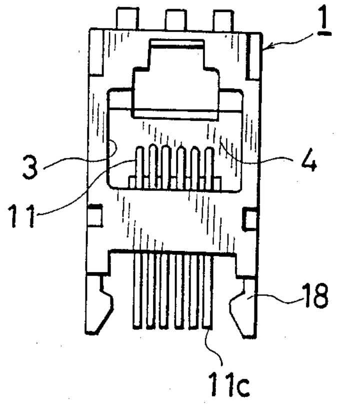
FIGS. 2 to 7 illustrate a first embodiment of the invention.
Figure 4:
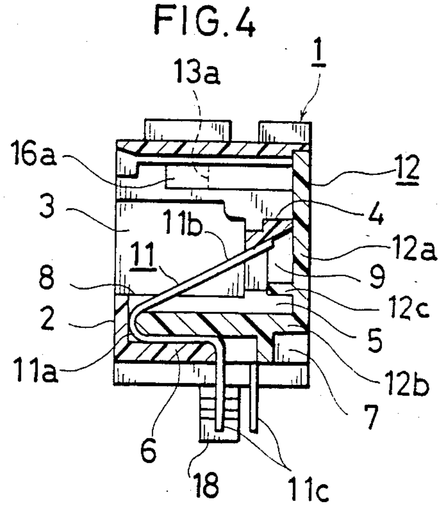

The numeral 11 designates springs each made of good conduction wire and which form conductive contact pieces received into the body 1. Each of the springs is plated on the surface with gold so as to reduce electric resistance. A bent portion 11*a* is formed by bending a length of wire into a U-shape having a first and a second free end 11*b*, 11*c* extending outwardly from either side of the main body portion 11*a*. Each of the springs 11, as best seen in FIG. 4, is utilized in such a manner that the U-shaped bent main body portion 11*a* is received into the lower holding groove 8 to raise the first free end 11*b* diagonally rearwardly to place the end 11*b* in the upper holding groove 9. The end 11*b* forms a conductive contact-maker movable into and out of contact with the electrodes of a plug. The other, second free end 11*c* is placed in the terminal leading groove 7 to project the end 11*c* outwardly from below the body 1. The end 11*c* forms a terminal adapted for connection with conductive portions of other electronic parts. The forwardly extending length of the main body 11*a* of spring 11 is made different so as to correspond to two kinds of terminal leading grooves 7 different in depth.

Figure 6:
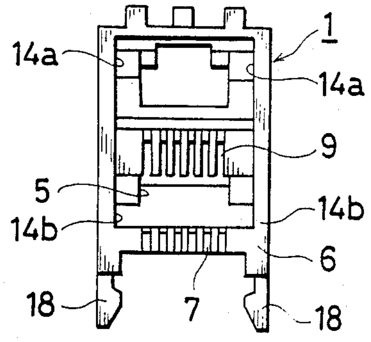

The numeral 12 designates a holder made of synthetic resin. The holder 12 is inserted into the holder mounting opening 5 formed in the body 1 and mounted on the body 1. When the holder 12 is inserted into the opening 5 and mounted on the body 1, the holder closes the holder mounting opening 5 substantially in a level plane to prevent dust from invading the body 1. The holder 12 has has a rear side portion 12*a* closing the holder mounting opening 5 and a projecting piece 12*b* inserted into the lower holding groove 8 for pressingly keeping the main body portion 11*a* of each spring 11 by the front end of the piece 12*b*. The projecting piece 12*b* and the rear side portion 12*a* as shown in FIGS. 2 and 6, are L-shaped in longitudinal section and formed integrally with each other. The rear side 12*a* of the holder 12 is provided on both upper and lower side edges with engaging pieces 16*a*, 16*b* having engaging claws 15*a*, 15*b*. The engaging claws 15*a*, 15*b* serve to positively bring the holder 12 into locking relation with the body 1 when the holder 12 is mounted in the holder mounting opening 5 of the body 1, by the claws coming into resilient engagement with the recesses 13*a*, 13*b* formed on the body 1 side.

Figure 7:
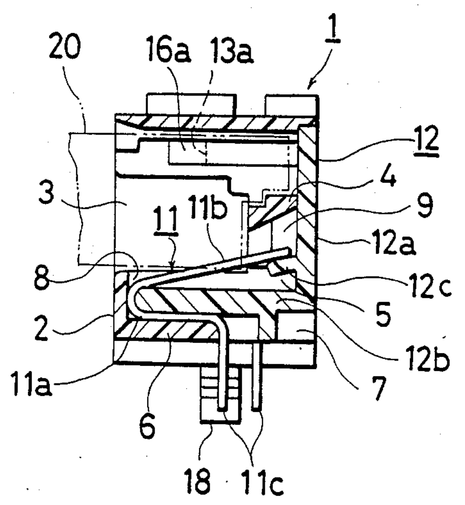
Figure 8:
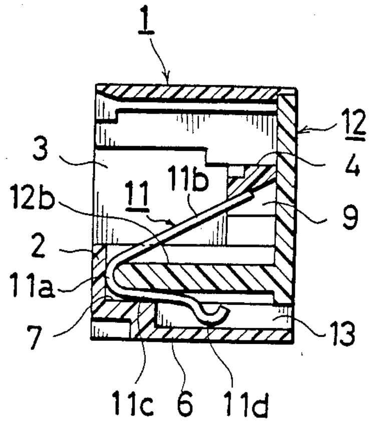
FIGS. 8 to 13 illustrate a second embodiment of the invention.
Figure 9A:
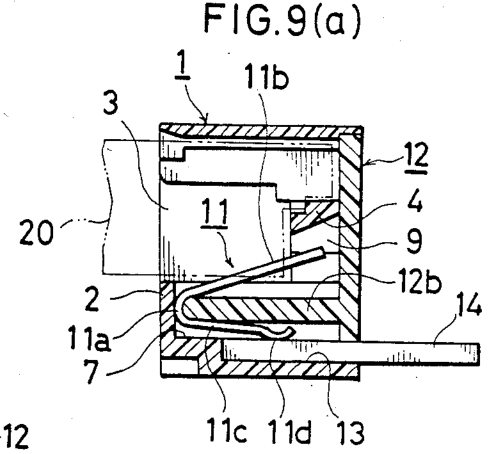
Figure 10:
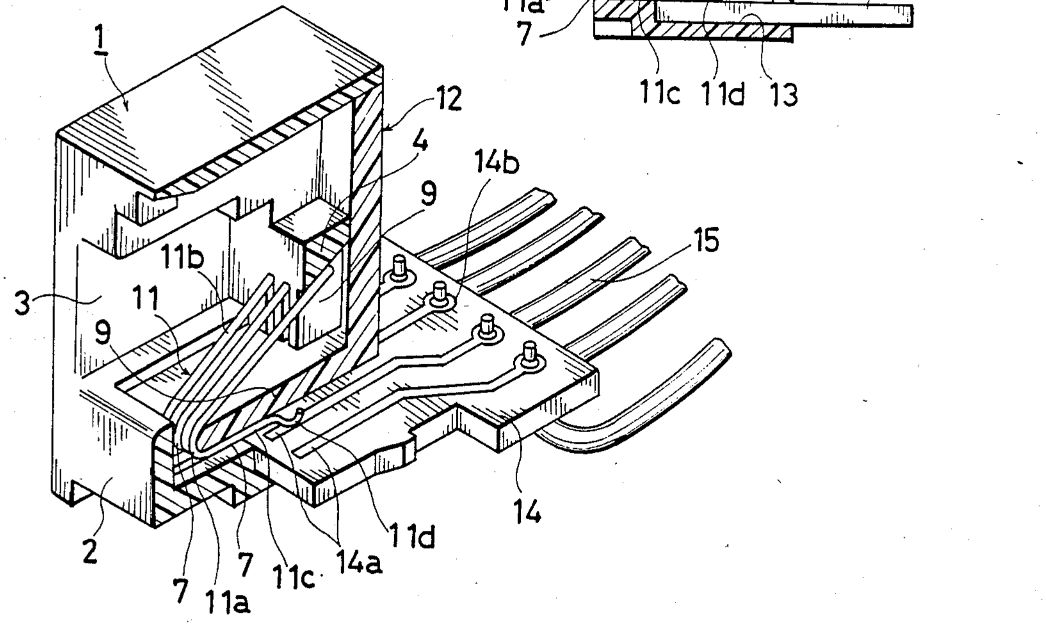

Also, in the embodiment shown, as best seen in FIGS. 4 and 7, a vertically elastically deformable resilient projection 12*c* is formed at a point corresponding to the upper holding grooves 9 in the inside surface of the rear side 12*a* of the holder 12. In the connector having such a projection, even when a plug 20 is inserted into the connector through the plug inlet 3 to press down the respective conductive contact-makers 11*b* of the springs, the resiliency of resilient projection 12*c* works to support the contact-makers 11*b*. Accordingly, even if the contact-makers 11*b* of springs 11 are about to be wrenched at the time of insertion of a plug, the resilient force of the resilient projection 12*c* can resist such wrenching to effectively prevent the contact-makers 11*b* from being wrenched by the inserted plug and to assure contact of the contact-makers with the plug 20. This prevents defective contact of the contact-makers 11*b* with the plug and is also effective for removal of a cause for production of noise.

The numeral 18 designates mounting legs provided on the bottom of the body 1, and the legs 18 have engaging claws 18*a* at the respective ends. Accordingly, it is possible to fix the body 1 in a printed board (not shown) by bringing the legs into resilient engagement with fitting holes of the printed board.

FIGS. 8 to 13 show a second embodiment of the invention. Since, in the figures, the same reference characters as those in the first embodiment designate the same or corresponding parts, a detailed description is omitted.

In the second embodiment, a connection groove 13 extending toward the front wall 2 side is additionally formed below the lower holding groove 8 of the body 1, and the second free end 11*c* of spring 11 is received into the connection groove 13. A contact projection 11*d* is provided at the front end of the second free end 11*c* of spring 11 received into the connection groove 13.

Figure 11:
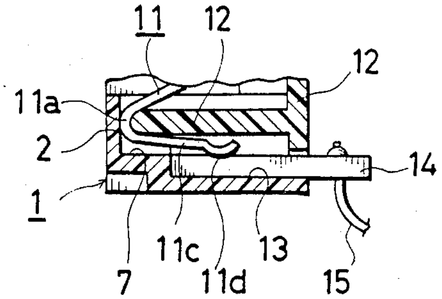
Figure 12:
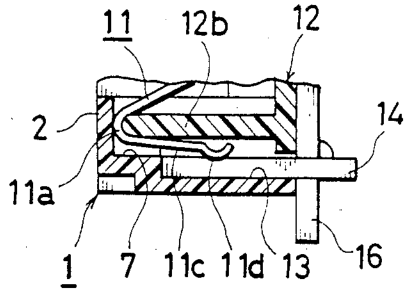
Figure 9B:
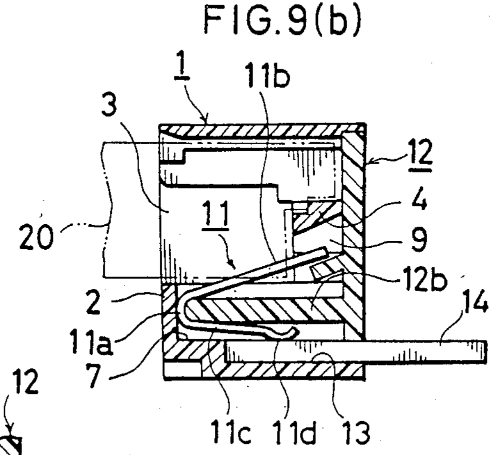
Figure 13:
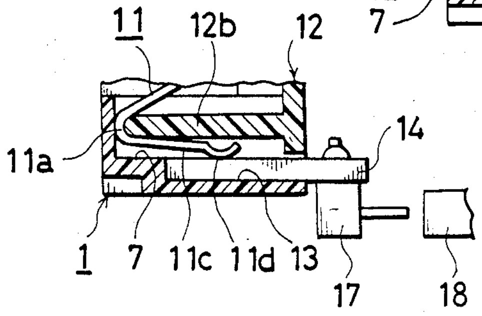

In the embodiment described, when conductive strips 14*a* such as silver foil applied over the printed board are disposed in the connection groove 13 of the body 13, the resilient force of spring 11 works to bring the second free end 11*c* of each spring 11 into resilient contact respectively with conductive strips 14*a* of the printed board 14, with the result that the body 1 is connected to the printed board 14 and simultaneously mounted on the printed board. Incidentally, FIGS. 11 to 13 show several examples of how the second embodiment is used. Namely, in the example of use shown in FIG. 11, a lead wire 15 is soldered to the terminal portion 14*b* of the printed board 14; in the example of use in FIG. 12, the printed board 14 is combined with another main printed board 16, and the conductive portions of both boards 14 and 16 are connected by welding; and in the example in FIG. 13, another connector 17 is connected to the terminal portion of the printed board 14 and a still another connector different from the connector 17 is to be removably connected to the conductor 17.

In the examples above, it is very convenient to connect the connector as to a printed board. In addition, there is not only so possibility of making wrong wiring in time of mounting but conversely there is provided an advantage of reducing an area of use. Also, the connection of the connector to the printed board by the use of resilience of springs provides the advantage that it makes positive connection and reduces the possibility of defective contact of a contact portion.

It is to be understood that this invention is not limited to the embodiments described above but that various changes and modifications may be made in the invention without departing from the spirit of the invention.

What is claimed is:

1. A telephone connector, comprising:

a box-shaped body, the body having front, rear and bottom walls, the front wall having a plug inlet formed therein for receiving a comb-tooth shaped plug along an insertion axis and the rear and bottom walls having a holder mounting opening formed therein communicating with the plug inlet, the holder mounting opening defining a rear edge of the bottom wall and a lower edge of the rear wall;

a plurality of terminal lead-in grooves through the bottom wall, open at the rear edge thereof and running forwardly, parallel to the insertion axis at predetermined spaced intervals from one another;

upwardly opening, lower holding grooves in the bottom wall forming forward extensions of the terminal lead-in grooves;

a plurality of upper holding grooves through the rear wall, open at the lower edge thereof and in alignment with the terminal lead-in grooves and the lower holding grooves formed in the bottom wall;

pre-shaped, electrically conductive springs, each having a U-shaped main body with first and second free ends, the main body of each of the springs being received into one of the lower holding grooves, the first free end being formed by an unbent extension of the U-shape disposed in a corresponding upper holding groove and forming a conductive portion for contact with an electrode of the plug, the second free end being formed by a bent extension of the U-shape extending downwardly through the corresponding lead-in groove through the bottom wall and forming a connection terminal portion for contact with conductive portions of other electronic parts; and, an L-shaped holder for the springs having a rear side portion and a projecting piece adapted to be locked into a position closing the holder opening to seal the body against dust intrusion, the projecting piece having a free edge pressably engaging the interiors of U-shaped main bodies of the springs and holding the spring in the grooves, whereby a plurality of fully pre-shaped electrical spring contacts may be easily inserted and precisely positioned in the body, and thereafter, positively secured therein.

2. A telephone connector according to claim 1, wherein the box-shaped body further comprises a connection groove, for receiving the bent extensions of the second free ends of the springs, disposed below the lower holding grooves, whereby conductive portions of other electronic parts may be inserted into the connection groove for contact with the springs.

3. A telephone connector according to claim 1, wherein the holder further comprises a rib projecting from the rear side portion and abutting the rear wall at a position adjacent to the upper holding grooves for supporting the first free ends of the springs against movement out of the upper holding grooves, whereby the springs are further maintained in position even during plug insertion and removal.

4. A telephone connector according to claim 3, wherein the rib is elastically deformable to resiliently support the first free ends.

5. A telephone connector according to claim 2, wherein the holder further comprises a rib projecting from the rear side portion and abutting the rear wall at a position adjacent to the upper holding grooves for supporting the first free ends of the springs against movement out of the upper holding grooves, whereby the springs are further maintained in position even during plug insertion and removal.

6. A telephone connector according to claim 5, wherein the rib is elastically deformable to resiliently support the first free ends.

* * * * *

UNITED STATES PATENT AND TRADEMARK OFFICE

CERTIFICATE OF CORRECTION

PATENT NO. : 4,556,264

DATED : December 3, 1985

INVENTOR(S) : Masanori Tanaka

It is certified that error appears in the above-identified patent and that said Letters Patent is hereby corrected as shown below:

Column 4, line 10 delete "has", first occurrence.

Column 4, line 23 delete "the claws".

Column 5, line 17 delete "so" and insert --no--.

In the abstract, line 17, delete "full" and insert --fully--.

Signed and Sealed this

*Twenty-sixth* Day of *August 1986*

[SEAL]

*Attest:*

DONALD J. QUIGG

*Attesting Officer* *Commissioner of Patents and Trademarks*